United States Patent
Suzuki

(10) Patent No.: US 9,384,053 B2
(45) Date of Patent: Jul. 5, 2016

(54) TASK ALLOCATION OPTIMIZATION SYSTEM, TASK ALLOCATION OPTIMIZATION METHOD, AND NON-TRANSITORY COMPUTER READABLE MEDIUM STORING TASK ALLOCATION OPTIMIZATION PROGRAM

(75) Inventor: Noriaki Suzuki, Tokyo (JP)

(73) Assignee: NEC CORPORATION, Tokyo (JP)

(*) Notice: Subject to any disclaimer, the term of this patent is extended or adjusted under 35 U.S.C. 154(b) by 516 days.

(21) Appl. No.: 13/880,575

(22) PCT Filed: May 31, 2011

(86) PCT No.: PCT/JP2011/003066
§ 371 (c)(1),
(2), (4) Date: Aug. 6, 2013

(87) PCT Pub. No.: WO2012/056609
PCT Pub. Date: May 3, 2012

(65) Prior Publication Data
US 2013/0312001 A1    Nov. 21, 2013

(30) Foreign Application Priority Data
Oct. 28, 2010    (JP) .................................. 2010-241703

(51) Int. Cl.
*G06F 9/46*    (2006.01)
*G06F 9/50*    (2006.01)

(52) U.S. Cl.
CPC ................ *G06F 9/5027* (2013.01); *G06F 9/50* (2013.01); *G06F 9/5066* (2013.01)

(58) Field of Classification Search
None
See application file for complete search history.

(56) References Cited

U.S. PATENT DOCUMENTS

| | | | | |
|---|---|---|---|---|
| 5,241,465 A * | 8/1993 | Oba | ................... | G06Q 10/0637 705/7.36 |
| 8,387,066 B1 * | 2/2013 | Becher | ................... | G06F 9/4881 709/223 |
| 8,656,403 B2 * | 2/2014 | An | ................... | G06F 9/5038 718/104 |
| 8,793,365 B2 * | 7/2014 | Arsovski | ................ | G06F 9/5027 709/224 |
| 8,881,158 B2 * | 11/2014 | Suzuki | ................... | G06F 9/5038 718/102 |
| 9,021,490 B2 * | 4/2015 | Marchand | ............. | G06F 9/4881 718/104 |

(Continued)

FOREIGN PATENT DOCUMENTS

| | | |
|---|---|---|
| JP | 6-332726 | 12/1994 |
| JP | 2007-264734 | 10/2007 |

(Continued)

OTHER PUBLICATIONS

International Search Report, PCT/JP2011/003066, Sep. 6, 2011.

*Primary Examiner* — Hiren Patel
(74) *Attorney, Agent, or Firm* — Young & Thompson

(57) ABSTRACT

A state evaluation function value generation unit 131 generates a state evaluation function value for each operating state based on a state/task-set correspondence table indicating a list of an operating state of a system including a plurality of processor-cores and correspondence of a task set to be operated in each operating state, and a task set parameter indicating a characteristic of each task constituting the task set. An integrated evaluation function value generation unit 132 generates an integrated evaluation function value in which the state evaluation function value of each operating state is integrated. An optimal allocation search unit 133 optimizes allocation of a task to be allocated to each of the plurality of processor-cores based on the integrated evaluation function value.

11 Claims, 13 Drawing Sheets

(56) References Cited

U.S. PATENT DOCUMENTS

| | | | |
|---|---|---|---|
| 2002/0138542 A1* | 9/2002 | Bollella | G06F 9/4887 718/102 |
| 2005/0203879 A1* | 9/2005 | Doris | G06F 9/50 |
| 2006/0218551 A1* | 9/2006 | Berstis | G06F 9/4881 718/102 |
| 2007/0226718 A1 | 9/2007 | Watanabe | |
| 2009/0144736 A1* | 6/2009 | Gunnels | G06F 9/4881 718/100 |
| 2009/0158293 A1* | 6/2009 | Kajihara | G06F 9/4881 718/106 |
| 2009/0210527 A1 | 8/2009 | Kawato | |
| 2011/0161964 A1* | 6/2011 | Piazza | G06F 9/4881 718/102 |
| 2011/0209153 A1* | 8/2011 | Suzuki | G06F 9/5038 718/102 |
| 2012/0331474 A1* | 12/2012 | Suzuki | G06F 9/4887 718/103 |
| 2014/0344825 A1* | 11/2014 | Suzuki | G06F 9/5022 718/103 |

FOREIGN PATENT DOCUMENTS

| | | | |
|---|---|---|---|
| JP | 2008-090546 | 4/2008 | |
| JP | 2009-122925 | 6/2009 | |
| JP | 2010-009288 | 1/2010 | |
| WO | WO 2007/136021 | 11/2007 | |
| WO | WO 2008148624 A1 * | 12/2008 | G06F 9/5066 |

* cited by examiner

| STATE | S1 | S2 | S3 | S4 |
|---|---|---|---|---|
| TASK A | ○ | | | |
| TASK B | ○ | | | |
| TASK C | | ○ | ○ | |
| TASK D | | | ○ | |
| TASK E | | ○ | ○ | ○ |
| TASK F | | ○ | ○ | ○ |
| TASK G | | | ○ | ○ |

Fig. 4

|  | EXECUTION TIME |
|---|---|
| TASK A | 10 |
| TASK B | 8 |
| TASK C | 18 |
| TASK D | 14 |
| TASK E | 7 |
| TASK F | 16 |
| TASK G | 9 |

Fig. 5

| STATE | S1 | S2 | S3 | S4 |
|---|---|---|---|---|
| TASK A | 10 | | | |
| TASK B | 8 | | | |
| TASK C | | 18 | 18 | |
| TASK D | | | 14 | |
| TASK E | | 7 | 7 | 7 |
| TASK F | | 16 | 16 | 16 |
| TASK G | | | 9 | 9 |

Fig. 6

| STATE | S1 | S2 | S3 | S4 |
|---|---|---|---|---|
| TASK A | 10 | | | |
| TASK B | 8 | | | |
| TASK C | | 18 | 18 | |
| TASK D | | | 14 | |
| TASK E | | 7 | 7 | 7 |
| TASK F | | 16 | 16 | 16 |
| TASK G | | | 9 | 9 |
| CORE 0 | 10 | 18 | 32 | 0 |
| CORE 1 | 8 | 23 | 32 | 32 |

Fig. 7

| STATE  | S1 | S2 | S3 | S4 |
|--------|----|----|----|----|
| TASK A | 10 |    |    |    |
| TASK B | 8  |    |    |    |
| TASK C |    | 18 | 18 |    |
| TASK D |    |    | 14 |    |
| TASK E |    | 7  | 7  | 7  |
| TASK F |    | 16 | 16 | 16 |
| TASK G |    |    | 9  | 9  |
| CORE 0 | 10 | 25 | 34 | 16 |
| CORE 1 | 8  | 16 | 30 | 16 |

Fig. 8

|  | DEPENDENCE |
|---|---|
| TASK A | B, C, G |
| TASK B |  |
| TASK C | D, E |
| TASK D | E, F |
| TASK E | F |
| TASK F |  |
| TASK G |  |

| STATE | S5 | S6 | S7 |
|---|---|---|---|
| TASK A | ○ | ○ | ○ |
| TASK B | ○ | | |
| TASK C | ○ | ○ | ○ |
| TASK D | ○ | | |
| TASK E | | ○ | |
| TASK F | ○ | ○ | ○ |
| TASK G | | ○ | |
| STATE EVALUATION FUNCTION VALUE (RELATED TECHNIQUE) | 1 | 1 | 1 |
| STATE EVALUATION FUNCTION VALUE (EXAMPLE 4) | 1 | 1 | 0 |

Fig. 11

TASK ALLOCATION OPTIMIZATION SYSTEM, TASK ALLOCATION OPTIMIZATION METHOD, AND NON-TRANSITORY COMPUTER READABLE MEDIUM STORING TASK ALLOCATION OPTIMIZATION PROGRAM

TECHNICAL FIELD

The present invention relates to a task allocation optimization system, a task allocation optimization method, and a non-transitory computer readable medium storing a task allocation optimization program, intended for a multi-core system in accordance with an AMP method.

BACKGROUND ART

In response to the increase in the demand for higher performance and lower power consumption for digital equipment in recent years, the multi-core configuration in which a plurality of processor-cores (hereinafter also simply referred to as "cores") are mounted on a built-in LSI (Large Scale Integration) has been attracting attention. This multi-core configuration for an LSI is also becoming an important technology in real-time systems for controlling systems and the like.

Multi-core systems are generally divided into an SMP (Symmetric Multi Processing) method and an AMP (Asymmetric Multi Processing) method.

In the SMP method, tasks are switched according to the available state of cores, the priority of the currently-executed task, and the like. Further, each task is configured so that it can be executed by any one of the cores. Therefore, it is possible to automatically distribute loads, and thus improving the overall performance of the system. However, since the automatic load distribution makes the prediction of the real-time performance very difficult, it is very difficult to adapt the SMP method to real-time systems.

On the other hand, in the AMP method, the system has a function-distribution-type configuration in which each task is executed only by a specific core. Therefore, the AMP method is suitable for real-time systems in which the ability to predict the system behavior is important, systems in which the cores to which specific hardware is connected are restricted, and the like.

In such a multi-core system in accordance with the AMP method, its performance changes depending on to which cores tasks are allocated. Therefore, in the multi-core system in accordance with the AMP method, it is necessary to search various ways of task allocation so that the optimal execution state is obtained and thereby to determine the optimal allocation.

Patent literature 1 discloses a technique relating to a tuning support apparatus that efficiently performs software tuning aimed at a multi-core processor equipped with a plurality of cores. FIG. 14 shows the configuration of the tuning support apparatus disclosed in Patent literature 1.

In this tuning support apparatus, firstly, a granularity information acquisition unit 201 acquires information about granularity (granularity information) assigned to each core. Note that the granularity is a unit, for example, for a process performed by a processor, and is a general term for tasks, functions, and processes constituting functions.

A configuration information generation unit 204 calculates the number of times of appearances for each task or each function included in a task based on the acquired granularity information, and thereby generates information about the calculated number of times of appearances (configuration information).

A dependence information generation unit 206 generates information about the dependence of each task or each function included in a task on other tasks or functions (dependence information) based on the acquired granularity information. An output unit 203 outputs each of these information items.

With this configuration, the tuning support apparatus can efficiently analyze and manage the configuration information for the load distribution. By using this analyzed information, it is possible to allocate tasks to cores with excellent performance in a multi-processor.

CITATION LIST

Patent Literature

Patent literature 1: Japanese Unexamined Patent Application Publication No. 2007-264734

SUMMARY OF INVENTION

Technical Problem

However, a problem that the optimal task allocation is not obtained in a certain operating state depending on the task allocation performed by the tuning support apparatus disclosed in Patent literature 1 could occur. This problem is described below.

On an ordinary system, all the tasks are not necessarily operated at all times. That is, the combination of tasks to be operated changes according to the operating state during the operation. In the above-described tuning support apparatus, it is assumed that the task allocation should be optimized by using all the tasks and that the task allocation should be optimized by using a set of tasks that are operated only in a specific operating state. As a result, the task allocation for all the tasks or a set of tasks that are operated in an operating state to be considered is optimized, and thus making it possible to make loads equally balanced. However, in an operating state that is not taken into consideration in the tuning support apparatus, there are possible cases in which the performance significantly deteriorates, for example, in which loads become unbalanced.

The present invention has been made mainly to solve the above-described problems, and a main object thereof is to provide a task allocation optimization system, a task allocation optimization method, and a non-transitory computer readable medium storing a task allocation optimization program, capable of implementing task allocation of a multi-processor system without causing performance deterioration in a specific operating state.

Solution to Problem

An aspect of a task allocation optimization system according to the present invention includes:
state evaluation function value generation means of generating a state evaluation function value for each operating state based on a state/task-set correspondence table indicating a list of an operating state of a system including a plurality of processor-cores and correspondence of a task set to be operated in each operating state, and a task set parameter indicating a characteristic of each task constituting the task set;

integrated evaluation function value generation means of generating an integrated evaluation function value in which the state evaluation function value of each operating state is integrated; and optimal allocation search means of optimizing allocation of a task to be allocated to each of the plurality of processor-cores based on the integrated evaluation function value.

An aspect of a task allocation optimization method according to the present invention includes:

generating a state evaluation function value for each operating state based on a state/task-set correspondence table indicating a list of an operating state of a system including a plurality of processor-cores and correspondence of a task set to be operated in each operating state, and a task set parameter indicating a characteristic of each task constituting the task set;

generating an integrated evaluation function value in which the state evaluation function value of each operating state is integrated; and optimizing allocation of a task to be allocated to each of the plurality of processor-cores based on the integrated evaluation function value.

An aspect of a non-transitory computer readable medium storing a task allocation optimization program according to the present invention is a non-transitory computer readable medium storing a program that causes a computer to execute a task allocation optimization process in a system including a plurality of processor-cores, in which the optimization process includes:

generating a state evaluation function value for each operating state based on a state/task-set correspondence table indicating a list of an operating state of the system including the plurality of processor-cores and correspondence of a task set to be operated in each operating state, and a task set parameter indicating a characteristic of each task constituting the task set;

generating an integrated evaluation function value in which the state evaluation function value of each operating state is integrated; and optimizing allocation of a task to be allocated to each of the plurality of processor-cores based on the integrated evaluation function value.

Advantageous Effects of Invention

According to the present invention, it is possible to provide a task allocation optimization system, a task allocation optimization method, and a non-transitory computer readable medium storing a task allocation optimization program, capable of implementing task allocation of a multi-processor system without causing performance deterioration in a specific operating state.

BRIEF DESCRIPTION OF DRAWINGS

FIG. 4 shows a specific example of a state/task-set correspondence table according to Example 1;

FIG. 5 shows a specific example of task set parameters according to Example 1;

FIG. 6 is an integrated table of a state/task-set correspondence table and task set parameters according to Example 1;

FIG. 7 shows an optimization operation of a tuning support apparatus according to Patent literature 1;

FIG. 8 shows an optimization operation of a task allocation optimization system according to Example 1;

FIG. 11 shows a state/task-set correspondence table according to Example 4;

DESCRIPTION OF EMBODIMENTS

First Exemplary Embodiment

Exemplary embodiments according to the present invention are explained hereinafter with reference to the drawings. In a multi-core system in accordance with the AMP method, its performance changes depending on to which cores tasks are allocated. An object of a task allocation optimization system according to this exemplary embodiment is to perform optimization so that high performance task allocation is achieved when a multi-core system in accordance with the AMP method adopting a function-distribution-type configuration in which each task is executed in a specific core is designed/implemented. In the following explanation, a multi-core system in accordance with the AMP method for which optimization is performed by a task allocation optimization system according to this exemplary embodiment is simply referred to as "multi-core system".

Figure 1:
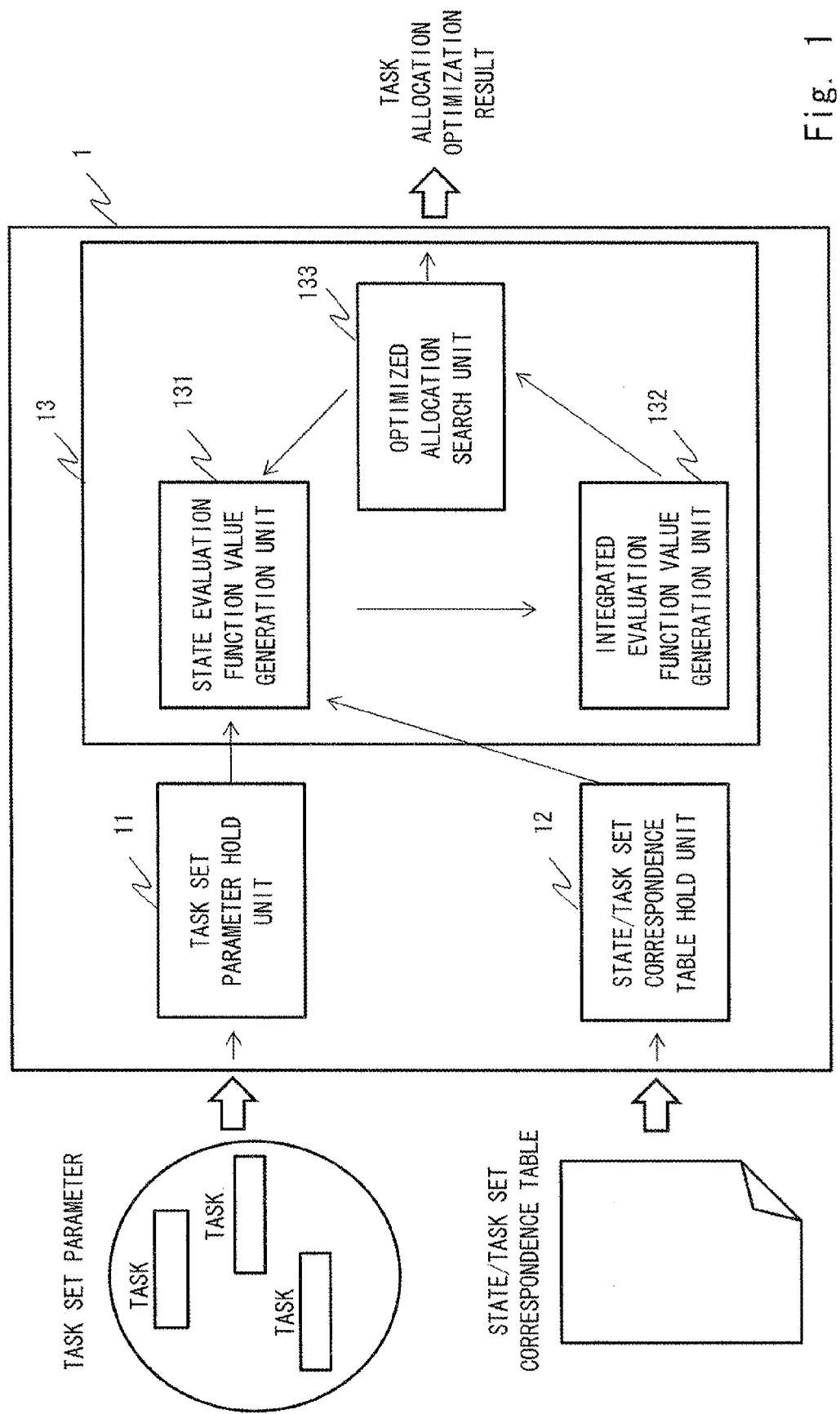
FIG. 1 is a block diagram showing a configuration of a task allocation optimization system according to a first exemplary embodiment.

FIG. 1 is a block diagram showing the overall configuration of a task allocation optimization system according to this exemplary embodiment. The task allocation optimization system 1 includes, as a configuration, a task set parameter hold unit 11, a state/task-set correspondence table hold unit 12, and an optimization unit 13.

The task set parameter hold unit 11 holds an externally-input task set parameter(s). The task set parameter is information indicating a characteristic(s) of each of the tasks constituting a task set (a set of a plurality of tasks to be allocated in a multi-core system). In the task set parameter, a starting cycle, a dependence relation with other tasks, an execution time, a necessary memory size, and the like are written for each task.

The state/task-set correspondence table hold unit 12 holds a state/task-set correspondence table indicating a list of operating states of the multi-core system and correspondence of a task set to be operated in each operating state.

An ordinary system including a multi-core system operates while changing its operating state according to the operating conditions. As the operating state of the system changes, the operation of that system changes in various ways. Therefore, in general, the tasks that are operated in a specific operating state(s) are a part of all the tasks. The state/task-set correspondence table indicates a list of operating states of the system and correspondence of a task set to be operated in each operating state.

The optimization unit 13 includes a state evaluation function value generation unit 131, an integrated evaluation function value generation unit 132, and an optimal allocation search unit 133.

The state evaluation function value generation unit 131 generates a state evaluation function value for a task set corresponding to a specific operating state. In particular, the state evaluation function value generation unit 131 reads out a task set parameter(s) from the task set parameter hold unit 11 and reads out a state/task-set correspondence table from the state/task-set correspondence table hold unit 12. Then, the state evaluation function value generation unit 131 generates a state evaluation function value for a task set corresponding to a specific operating state based on these information items. In general, a state evaluation function value is generated for each of all the operating states to be tested. The state evaluation function value is an evaluation value indicating the quality of task allocation in each operating state.

The integrated evaluation function value generation unit 132 integrates the state evaluation function values for all the operating states to be tested and thereby generates an integrated evaluation function value.

The optimal allocation search unit 133 searches for task allocation for which the integrated evaluation function value output by the integrated evaluation function value generation unit 132 is better. An example of the simplest search method is a full search. In the full search, all the allocation candidates are generated one by one. Then, an allocation candidate having the best integrated evaluation function value among all the allocation candidates is output as a search result to a display screen or the like. However, it is desirable to use a publicly-known speed-up technique such as a branch and bound method, a greedy method, and a genetic algorithm in order to realize an efficient search.

Note that specific examples of the task set parameter, the state/task-set correspondence table, the state evaluation function value, and the integrated evaluation function value are explained later with Example 1 and the like described below.

Figure 2:
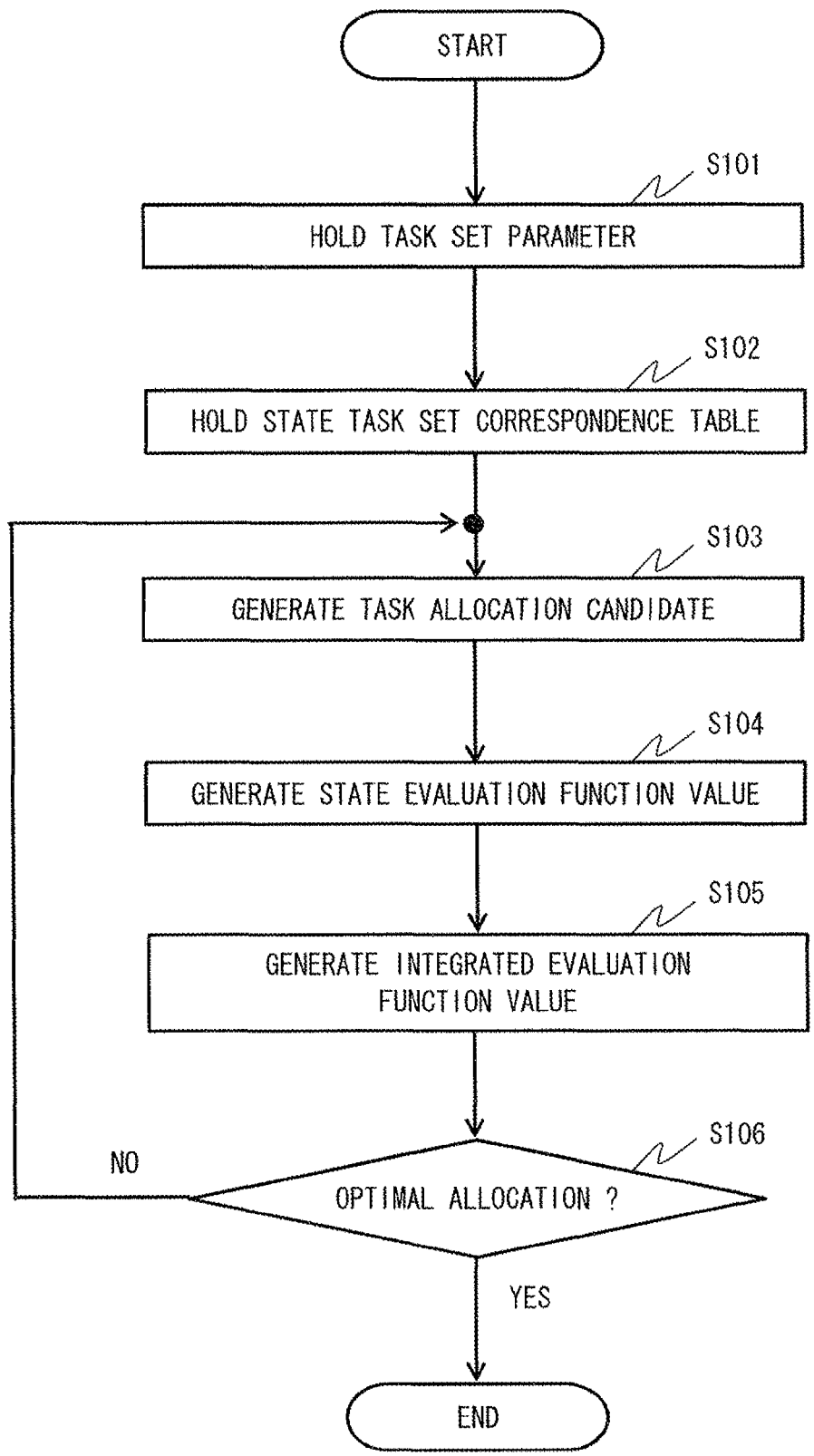
FIG. 2 is a flowchart showing a process flow of a task allocation optimization system according to a first exemplary embodiment.

Next, an operation of the task allocation optimization system 1 according to this exemplary embodiment is explained with reference to a flowchart shown in FIG. 2.

Firstly, the task set parameter hold unit 11 holds an externally-input task set parameter(s) (step S101). Next, the state/task-set correspondence table hold unit 12 holds an externally-input state/task-set correspondence table (step S102).

Note that the above-described steps S101 and S102 are processes that can be performed in an arbitrary order. That is, it is possible to perform the step S102 before the step S101, or perform the steps S101 and S102 in parallel.

The optimal allocation search unit 133 generates a task allocation candidate (candidate data indicating which tasks should be allocated to which cores) (S103). Then, the state evaluation function value generation unit 131 generates a state evaluation function value of each operating state for the generated task allocation candidate (S104).

The integrated evaluation function value generation unit 132 generates an integrated evaluation function value in which the state evaluation function values generated by the state evaluation function value generation unit 131 are integrated (S105).

The optimal allocation search unit 133 determines whether a task allocation search finish condition is satisfied or not by taking the integrated evaluation function value into consideration (S106). When the task allocation search finish condition is not satisfied (S106: No), the process is repeated again from the step S103. On the other hand, when the task allocation search finish condition is satisfied (S106: Yes), the optimal allocation search unit 133 outputs a task allocation optimization result and finishes the process.

Note that the task allocation search finish condition changes depending on what kind of optimization algorithm the optimal allocation search unit 133 adopts. When the simple full search is used as the optimization algorithm, the search finish condition is the completion of the generation of all the task allocation candidates. In this case, the optimal allocation search unit 133 outputs a task allocation candidate having the optimal integrated evaluation function value as the optimization result. In contrast to this, when other ordinary optimization algorithms are adopted, the search finish condition is determined by taking account of a case where it is determined that the integrated evaluation function value will not improve any more, a case where the integrated evaluation function value does not improve even when the generation of a task allocation candidate has been repeated a certain number of times, and the like.

Next, advantageous effects of the task allocation optimization system according to this exemplary embodiment are explained. As described above, the state evaluation function value generation unit 131 calculates a state evaluation function value indicating the quality of task allocation for each operating state based on the state/task-set correspondence table and the task set parameter(s). The integrated evaluation function value generation unit 132 integrates the state evaluation function values of all the operating states and thereby calculates an integrated evaluation function value, which is the overall evaluation value of the multi-core system. By optimizing the task allocation by using this integrated evaluation function value, it is possible to take processing performances in respective operating states into consideration. As a result, it is possible to avoid the problem that performance significantly deteriorates in a specific operating state(s).

When task allocation is optimized by using all the tasks as in the case of the tuning apparatus disclosed in Patent literature 1, there are cases where it is incorrectly determined that the performance is insufficient (for example, in the case of a real-time system, the deadline is not met) even in a multi-core system in which the performance is sufficient in reality. This is because, as described previously, all the tasks are not necessarily operated at all times in ordinary systems. For example, there are cases where, for given two tasks, only one of them is operated according to the operating state in a multi-core system. That is, there are cases where handling all the tasks in a collective manner is inappropriate.

In the task allocation optimization system according to this exemplary embodiment, it is possible to perform optimization while taking account of tasks that are not simultaneously operated in reality by performing the optimization by calculating a state evaluation function value of each operating state and integrating them. As a result, the task allocation optimization system according to this exemplary embodiment can output the optimal task allocation with which the performance is appropriately sufficient even when the task allocation optimization system is applied to a multi-core system in which the performance is determined to be insufficient when the task allocation is optimized by using all the tasks.

Second Exemplary Embodiment

Figure 3:
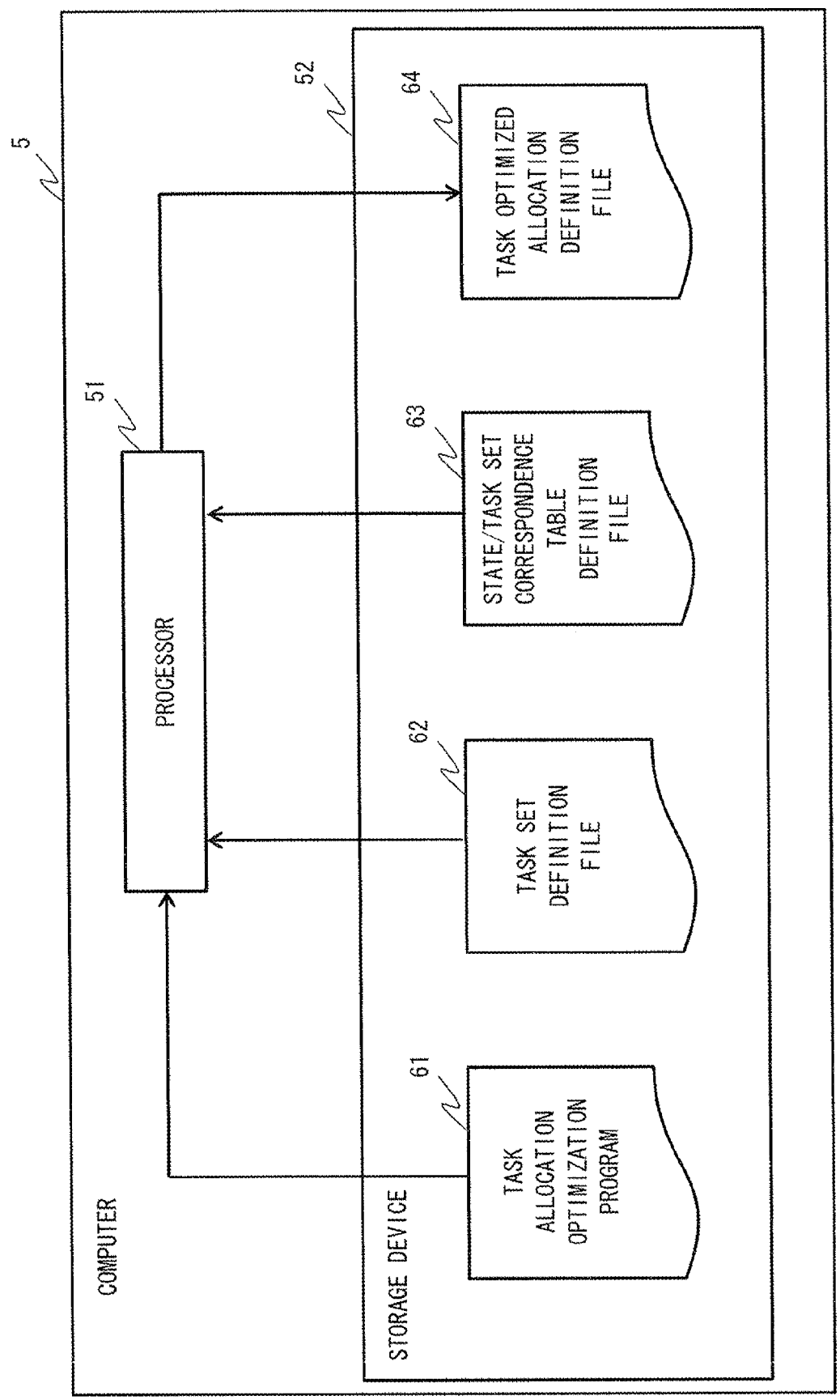
FIG. 3 is a block diagram showing a configuration of a task allocation optimization system according to a second exemplary embodiment.

Next, a task allocation optimization system according to a second exemplary embodiment of the present invention is explained in detail with reference to the drawings. FIG. 3 is a block diagram showing the overall configuration of a task allocation optimization system according to this exemplary embodiment. The task allocation optimization system according to this exemplary embodiment is characterized in that the processes explained above in the first exemplary embodiment are executed as a program by a computer 5. Each process, which is executed as a program, is roughly the same as that in the first exemplary embodiment.

The computer 5 includes a processor 51 and a storage device 52. The storage device 52 may be, for example, a hard disk drive. The processor 51 executes a program, so that it operates as a task allocation optimization system.

The task set is expressed in a task set definition file 62. The state/task-set correspondence table is expressed in a state/task-set correspondence table definition file 63. The task set definition file 62 and the state/task-set correspondence table definition file 63 are read by the processor 51 when a task allocation optimization program 61 is executed. The processor 51 executes the task allocation optimization program 61 and thereby optimizes the task allocation. The processor 51 outputs a task allocation optimization result as a task optimal allocation definition file 64 to the storage device 52.

The program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

As described above, it is possible to implement the optimization of task allocation of a multi-processor system according to the ATM method even when it is implemented in the form of a program.

Example 1

Next, an operation of a task allocation optimization system according to the first exemplary embodiment is explained by using specific examples. In Examples 1 to 4 shown below, a multi-core system to which the task allocation optimization system 1 is applied includes a core 0 and a core 1.

In this example, the state evaluation function value generation unit 131 generates the absolute value of a difference between the execution time of the core 0 and the execution time of the core 1 as the state evaluation function value. The integrated evaluation function value generation unit 132 generates the sum of state evaluation function values in each operating state as the integrated evaluation function value. The optimal allocation search unit 133 performs optimization in which allocation for which the integrated evaluation function value is the smallest is searched for.

FIG. 4 shows a specific example of a state/task-set correspondence table. As shown in the figure, relations between all the possible operating states the multi-core system can take and tasks that are executed in those operating states are shown. In the example shown in FIG. 4, the multi-core system can take four states, i.e., S1, S2, S3 and S4 as an operating state. Further, it is shown that tasks A and B are executed in the state S1 and that tasks C, E and F are executed in the state S2. Similarly, it is shown that tasks C to G are executed in the state S3 and that tasks E, F and G are executed in the state S2.

FIG. 5 shows an example of task set parameters. In this example, an execution time required to perform each task is written as a parameter. FIG. 6 is a table in which the specific example of a state/task-set correspondence table shown in FIG. 4 and the specific example of task set parameters shown in FIG. 5 are integrated.

Optimization of task allocation performed by a task allocation optimization system when the state/task-set correspondence table shown in FIG. 4 and the task set parameters shown in FIG. 5 are input is explained hereinafter. The optimization is performed in terms of that the execution time of a task allocated to each core is to be averaged.

Note that the optimization with attention being paid to the state S1 is performed independently. Then, in the optimization of the states S2 to S4, a comparison between optimization performed by using the optimization technique disclosed in Patent literature 1 and optimization performed by using the optimization technique described in the first exemplary embodiment is examined.

In the optimization technique disclosed in Patent literature 1, a case where optimization is performed with attention being paid to the state S3 in which a larger number of tasks are operated than that in any other state is examined. FIG. 7 shows an aspect of this optimization.

In FIG. 7, in each task row, when that task is executed in the operating state concerned, the execution time shown in FIG. 5 is written. Among them, the tasks surrounded by broken lines (tasks A, C and D) are allocated to the core 0 and the other tasks are allocated to the core 1. In FIG. 7, in the rows of the cores 0 and 1, the total execution times of the tasks allocated to the respective cores in each of the states (S1 to S4) are shown.

Note that in the example shown in FIG. 7, optimization is performed with attention being paid to the state S3. That is, in the state S3, the execution time in the core 0 is perfectly balanced with the execution time in the core 1 (that is, their execution times are both 32). However, in this task allocation, in the state S4, tasks are executed only in the core 1 and no tasks are executed in the core 0. That is, in the state S4, the task allocation is unbalanced.

Next, an example of an optimization result obtained by a task allocation optimization system according to the first exemplary embodiment is shown. The integrated evaluation function value in the above-described task allocation shown in FIG. 7 is expressed as "2+5+0+32=39". However, in reality, there is task allocation for which the integrated evaluation function value is smaller. The task allocation optimization system 1 in this example determines allocation for which the integrated evaluation function value is the smallest as the optimal allocation. Various optimization algorithms using existing techniques can be applied to the optimal allocation search unit 133. FIG. 8 shows an example of optimal allocation calculated by the optimal allocation search unit 133.

The integrated evaluation function value in the allocation shown in FIG. 8 is expressed as "2+9+4+0=15", and is smaller than the integrated evaluation function value shown in FIG. 7. In comparison to FIG. 7, the allocation shown in FIG. 8 is allocation in which the execution times in each state are well balanced.

Example 2

Example 2 is an application example of the task allocation optimization system 1 of Example 1, in which the state evaluation function value generation unit 131 uses the square of a difference between execution times as the state evaluation function value. That is, the state evaluation function value generation unit 131 generates the square of the difference between the execution time of the core 0 and the execution time of the core 1 as the state evaluation function value. The integrated evaluation function value generation unit 132 generates the sum of state evaluation function values in each operating state as the integrated evaluation function value.

In the following explanation, two allocation examples in which their integrated evaluation function values become equal to each other depending on the task allocation optimization system 1 of Example 1 are examined. In the first allocation A, the state evaluation function values in the states S1, S2, S3 and S4 are 1, 1, 1 and 5 respectively. In the second allocation B, the state evaluation function values in the states S1, S2, S3 and S4 are 2, 2, 2 and 2 respectively. When the integrated evaluation function values of these allocations are generated by the task allocation optimization system 1 of Example 1, the integrated evaluation function value of the allocation A is expressed as "1+1+1+5=8" and the integrated evaluation function value of the allocation B is expressed as "2+2+2+2=8". Therefore, they have the same value.

In the task allocation optimization system 1 of Example 2, the state evaluation function value is the square of a difference between execution times. Therefore, the integrated evaluation function value of the allocation A is expressed as "1+1+1+25=28" and the integrated evaluation function value of the allocation B is expressed as "4+4+4+4=16". Note that since the optimal allocation search unit 133 selects allocation whose integrated evaluation function value is small as the optimal allocation, it determines that the allocation B is the appropriate allocation.

As shown above, an operating state in which the degree of imbalance (difference between state evaluation function values) is large has a large influence on the integrated evaluation function value. Therefore, when it is desired to avoid the occurrence of an operating state in which the balance is extremely poor as much as possible, it is effective to use the square of a difference between execution times as the state evaluation function value as in the case of this example.

Example 3

Example 3 is a modified example of the task allocation optimization system 1 of Example 1, in which the product of state evaluation function values is used as the integrated evaluation function value. That is, the state evaluation function value generation unit 131 generates the absolute value of the difference between the execution time of the core 0 and the execution time of the core 1 as the state evaluation function value. The integrated evaluation function value generation unit 132 generates the product of state evaluation function values in each operating state as the integrated evaluation function value.

Allocation A and allocation B similar to those in Example 2 are examined hereinafter. In this case, the integrated evaluation function value of the allocation A is expressed as "1×1×1×5=5" and the integrated evaluation function value of the allocation B is expressed as "2×2×2×2=16". Note that since the optimal allocation search unit 133 selects allocation whose integrated evaluation function value is small as the optimal allocation, it determines that the allocation A is the appropriate allocation.

As shown above, when the number of operating states in each of which the degree of imbalance is small (operating states in which the difference between state evaluation function values is small) is large, the integrated evaluation function value becomes smaller. This example has the above-described property. Therefore, when it is desired to reduce the load balance in as large number of operating states as possible even if there are operating states in which the load balance is somewhat poor (operating states in which the difference between state evaluation function values is large), it is effective to use the method of Example 3 (method in which the product of state evaluation function values is used as the integrated evaluation function value).

However, when the product of state evaluation function values is used as the integrated evaluation function value, if at least one of the state evaluation function values is zero, the integrated evaluation function value becomes zero regardless of the state evaluation function values in the other operating states. Therefore, it is necessary to be careful so that the value does not become zero when the calculation method for the state evaluation function values is determined.

Example 4

An example in which a task parameter set describing dependence between tasks is input is shown as a task allocation optimization system 1 of Example 4. The state evaluation function value generation unit 131 outputs the number of inter-core dependences as the state evaluation function value for each operating state.

The inter-core dependence means a state in which there are tasks having a dependence relation and these tasks are allocated in different cores. As an example, only two tasks consisting of a task A and a task B that is dependent on the task A are examined. When the tasks A and B are allocated to different cores, the number of inter-core dependences becomes one. In contrast to this, when the tasks A and B are allocated to the same core, the number of inter-core dependences becomes zero. In general, when data is transmitted between cores, a certain time is required. Therefore, it is desirable that the number of inter-core dependences is as small as possible.

An example of optimization in which the number of inter-core dependences is minimized under the condition that the number of tasks allocated to each core is the same or is different only by one in all the operating states is shown below.

Figures 9, 10:
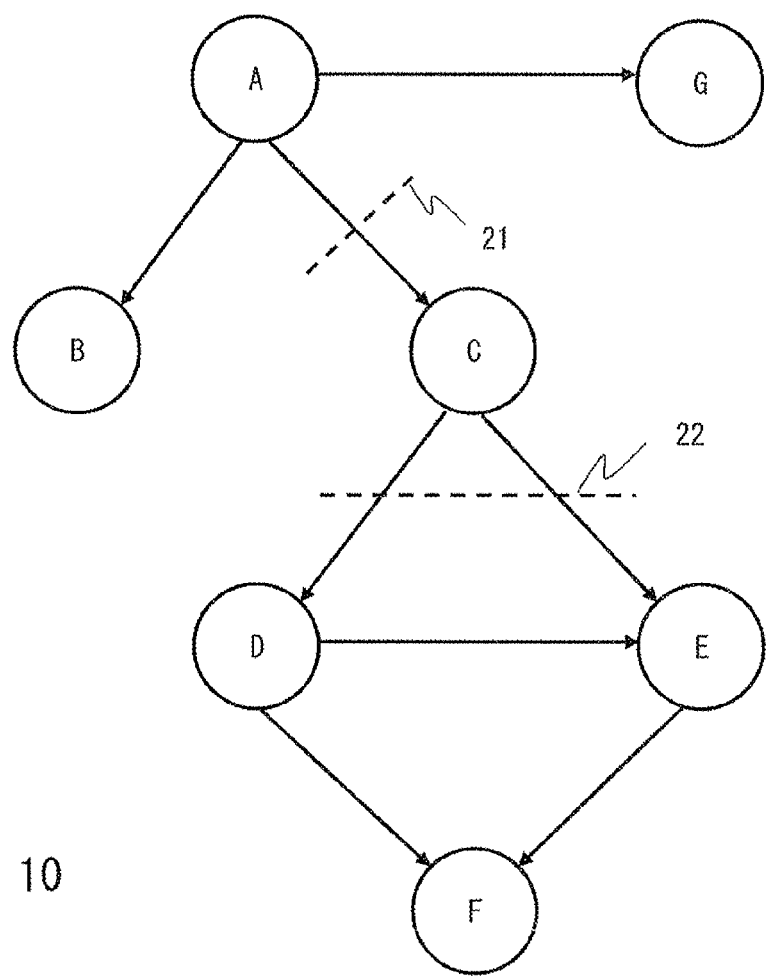
FIG. 9 shows task set parameters according to Example 4.
FIG. 10 shows dependence relations described in task set parameters shown in FIG. 9.

Firstly, FIG. 9 shows an example of task set parameters. In FIG. 9, in the dependence relation column, information about tasks that are dependent on that task is described. For example, in the row of a task A, tasks B, C and G are written. Based on this information, it is indicated that the tasks B, C and G are dependent on the task A. That is, the process of each of the tasks B, C and G is carried out by using the processing result of the task A.

FIG. 10 shows dependence relations described in the task set parameters shown in FIG. 9.

FIG. 11 shows a state/task-set correspondence table showing a list of operating states of a system and correspondence of a task set to be operated in each operating state. In the example shown in FIG. 11, there are three states S5, S6 and S7 as operating states of the system. In the state S5, tasks A, B, C, D and F are operated. In the state S6, tasks A, C, E, F and G are operated. Similarly, in the state S7, tasks A, C and F are operated.

Firstly, a decision about the optimal allocation by the optimization technique disclosed in Patent literature 1 is explained. In this technique, information about which tasks are operated in each operating state is not taken into consideration. Therefore, an allocation candidate in which the task allocation is divided at a place where the dependence is the smallest when the dependence of all the task sets are taken into consideration is output. In the example shown in FIG. 10, the task allocation is divided at a division place 21. That is, an allocation candidate in which the tasks A, B and G are allocated to the core 0 and the tasks C, D, E and F are allocated to the core 1 (or vice versa) is output.

Figure 12:
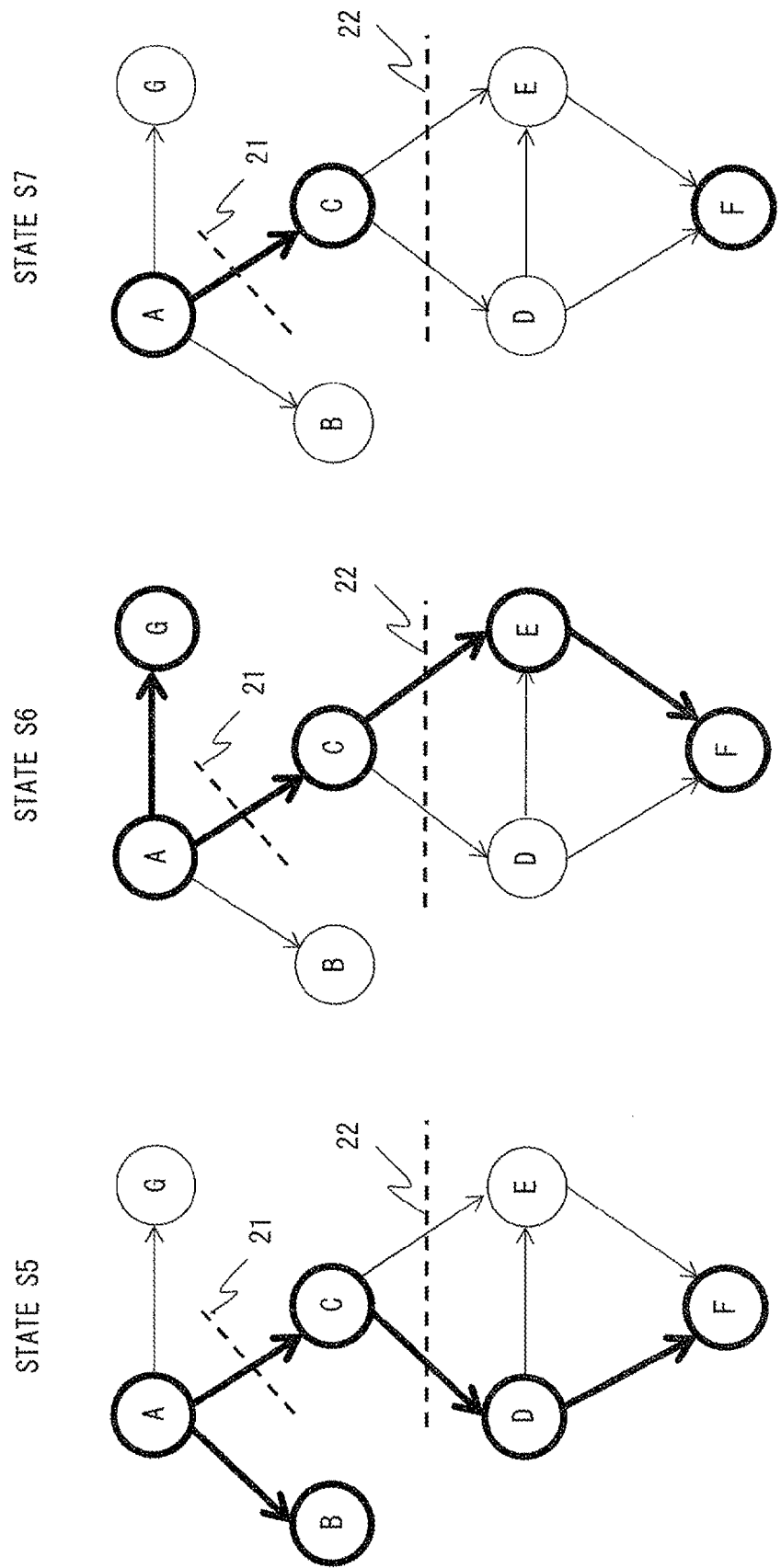
FIG. 12 shows diagrams according to Example 4 in which only a task(s) to be operated in each operating state and effective inter-core dependence are indicated by thick lines.

The number of inter-core dependences in a task allocation candidate according to this technique (task allocation divided at the division position 21 in FIG. 10) is shown below. FIG. 12 shows dependence relations in which only tasks to be operated and effective inter-core dependence in each operating state are indicated by thick lines. As obvious from FIG. 12, there is one inter-core dependence in every operating state in the optimization technique disclosed in Patent literature 1.

Next, optimization performed by the task allocation optimization system 1 according to this exemplary embodiment is explained. As described above, the state evaluation function value generation unit 131 outputs the number of inter-core dependences for each operating state as the state evaluation function value. The integrated evaluation function value generation unit 132 calculates an integrated evaluation function value in which these state evaluation function values are integrated. The optimal allocation search unit 133 performs optimization by using this integrated evaluation function value. As a result, a division position other than the division position 21 in FIGS. 10 and 12 could become a candidate.

Note that when a division position 22 in FIGS. 10 and 12 is used as a task allocation candidate, the state evaluation function value becomes 1, 1 and 0 in the states S5, S6 and S7 respectively and the integrated evaluation function value is expressed as "1+1+0=2" (FIG. 11, state evaluation function value (Example 4) row). Since the integrated evaluation function value in the allocation example in the technique disclosed in Patent literature 1 is expressed "1+1+1=3" (FIG. 11, state evaluation function value (related technique) row), this enables the task allocation optimization system 1 in this example to output allocation having a better evaluation value, i.e., an optimization result in which the tasks A, B, C and G are allocated to the core 0 and the tasks D, E and F are allocated to the core 1 (or vice versa).

As described above, in this example, it is possible to output allocation in which the number of inter-core dependences is zero in the state S7 and thereby to calculate task allocation having better performance.

Note that the present invention is not limited to the above-described exemplary embodiments and various modifications can be made without departing from the spirit and scope of the present invention. For example, the above-described processing performed by each processing unit of the optimization unit 13 may be distributed over different hardware elements and performed by those hardware elements.

Figure 13:
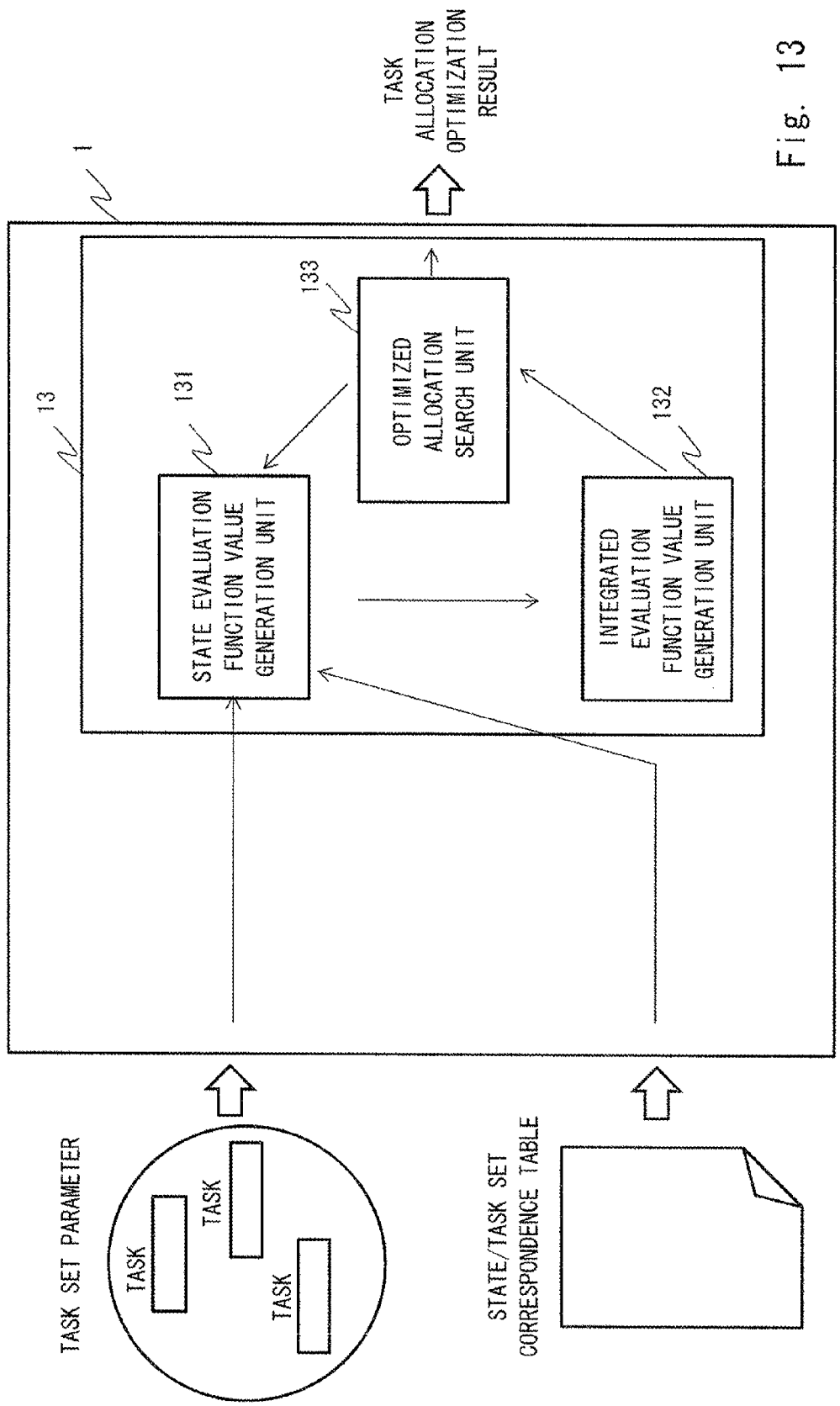
FIG. 13 is a block diagram showing a configuration of a task allocation optimization system according to a first exemplary embodiment.
Figure 14:
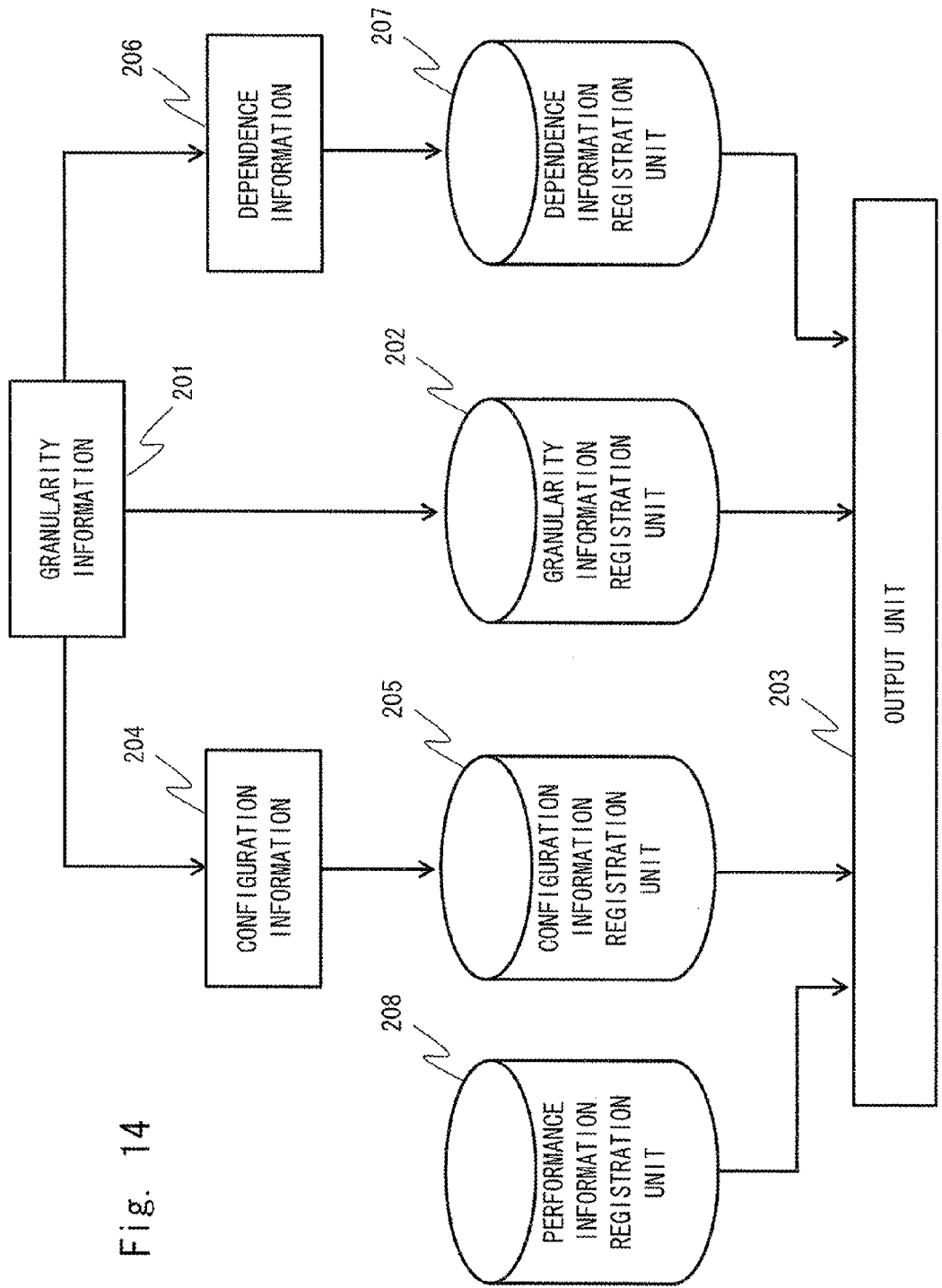
FIG. 14 is a block diagram showing a configuration of a tuning support apparatus according to Patent literature 1.

Note that FIG. 13 shows the minimum configuration of a task allocation optimization system 1 according to the first exemplary embodiment. This configuration is similar to that shown in FIG. 1 except that the task set parameters and the state/task-set correspondence table are directly supplied to the state evaluation function value generation unit 131.

The whole or part of the exemplary embodiments disclosed above can be described as, but not limited to, the following supplementary notes.

(Supplementary Note 1)

A task allocation optimization system including:

state evaluation function value generation means of generating a state evaluation function value for each operating state based on a state/task-set correspondence table indicating a list of an operating state of a system including a plurality of processor-cores and correspondence of a task set to be operated in each operating state, and a task set parameter indicating a characteristic of each task constituting the task set;

integrated evaluation function value generation means of generating an integrated evaluation function value in which the state evaluation function value of each operating state is integrated; and optimal allocation search means of optimizing allocation of a task to be allocated to each of the plurality of processor-cores based on the integrated evaluation function value.

(Supplementary Note 2)

The task allocation optimization system described in Supplementary note 1, in which the state evaluation function value generation means uses an absolute value of a difference between total execution times of tasks allocated to each processor-core as the state evaluation function value.

(Supplementary Note 3)

The task allocation optimization system described in Supplementary note 1, in which the state evaluation function value generation means uses a square of a difference between total execution times of tasks allocated to respective processor-cores as the state evaluation function value.

(Supplementary Note 4)

The task allocation optimization system described in Supplementary note 1, in which the state evaluation function value generation means uses a number of dependences between processor-cores as the state evaluation function value.

(Supplementary Note 5)

The task allocation optimization system described in any one of Supplementary notes 1 to 4, in which the integrated evaluation function value generation means uses a sum total of the state evaluation function value in each operating state as the integrated evaluation function value.

(Supplementary Note 6)

The task allocation optimization system described in any one of Supplementary notes 1 to 4, in which the integrated evaluation function value generation means uses a product of all state evaluation function value in each operating state as the integrated evaluation function value.

(Supplementary Note 7)

The task allocation optimization system described in any one of Supplementary notes 1 to 6, further including:

state/task-set correspondence table hold means of holding an externally-input state/task-set correspondence table; and task set parameter hold means of holding an externally-input task set parameter.

(Supplementary Note 8)

The task allocation optimization system described in any one of Supplementary notes 1 to 7, in which the optimal allocation search means selects an allocation candidate having a small integrated evaluation function value preferentially as optimal allocation.

(Supplementary Note 9)

A task allocation optimization method including:

generating a state evaluation function value for each operating state based on a state/task-set correspondence table indicating a list of an operating state of a system including a plurality of processor-cores and correspondence of a task set to be operated in each operating state, and a task set parameter indicating a characteristic of each task constituting the task set;

generating an integrated evaluation function value in which the state evaluation function value of each operating state is integrated; and optimizing allocation of a task to be allocated to each of the plurality of processor-cores based on the integrated evaluation function value.

(Supplementary Note 10)

The task allocation optimization method described in Supplementary note 9, in which in the process for generating the state evaluation function value, an absolute value of a difference between total execution times of tasks allocated to each processor-core is used as the state evaluation function value.

(Supplementary Note 11)

The task allocation optimization method described in Supplementary note 9, in which in the process for generating the state evaluation function value, a square of a difference between total execution times of tasks allocated to respective processor-cores is used as the state evaluation function value.

(Supplementary Note 12)

The task allocation optimization method described in Supplementary note 9, in which in the process for generating the state evaluation function value, a number of dependences between processor-cores is used as the state evaluation function value.

(Supplementary Note 13)

The task allocation optimization method described in any one of Supplementary notes 9 to 12, in which in the process for generating the integrated evaluation function value, a sum total of the state evaluation function value in each operating state is used as the integrated evaluation function value.

(Supplementary Note 14)

The task allocation optimization method described in any one of Supplementary notes 9 to 12, in which in the process for generating the integrated evaluation function value, a product of all state evaluation function value in each operating state is used as the integrated evaluation function value.

(Supplementary Note 15)

The task allocation optimization method described in any one of Supplementary notes 9 to 14, in which in the process for optimizing the task allocation, an allocation candidate having a small integrated evaluation function value is preferentially selected as optimal allocation.

(Supplementary Note 16)

A non-transitory computer readable medium storing a task allocation optimization program that causes a computer to execute a task allocation optimization process in a system including a plurality of processor-cores, in which the optimization process includes:

generating a state evaluation function value for each operating state based on a state/task-set correspondence table indicating a list of an operating state of the system including the plurality of processor-cores and correspondence of a task set to be operated in each operating state, and a task set parameter indicating a characteristic of each task constituting the task set;

generating an integrated evaluation function value in which the state evaluation function value of each operating state is integrated; and optimizing allocation of a task to be allocated to each of the plurality of processor-cores based on the integrated evaluation function value.

(Supplementary Note 17)

The non-transitory computer readable medium storing a task allocation optimization program described in Supplementary note 16, in which in the process for generating the state evaluation function value, an absolute value of a difference between total execution times of tasks allocated to each processor-core is used as the state evaluation function value.

(Supplementary Note 18)

The non-transitory computer readable medium storing a task allocation optimization program described in Supplementary note 16, in which in the process for generating the state evaluation function value, a square of a difference between total execution times of tasks allocated to respective processor-cores is used as the state evaluation function value.

(Supplementary Note 19)

The non-transitory computer readable medium storing a task allocation optimization program described in Supplementary note 16, in which in the process for generating the state evaluation function value, a number of dependences between processor-cores is used as the state evaluation function value.

(Supplementary Note 20)

The non-transitory computer readable medium storing a task allocation optimization program described in any one of Supplementary notes 16 to 19, in which in the process for generating the integrated evaluation function value, a sum total of the state evaluation function value in each operating state is used as the integrated evaluation function value.

(Supplementary Note 21)

The non-transitory computer readable medium storing a task allocation optimization program described in any one of Supplementary notes 16 to 19, in which in the process for generating the integrated evaluation function value, a product of all state evaluation function value in each operating state is used as the integrated evaluation function value.

(Supplementary Note 22)

The non-transitory computer readable medium storing a task allocation optimization program described in any one of Supplementary notes 16 to 21, in which in the process for optimizing the task allocation, an allocation candidate having a small integrated evaluation function value is preferentially selected as optimal allocation.

This application is based upon and claims the benefit of priority from Japanese patent application No. 2010-241703, filed on Oct. 28, 2010, the disclosure of which is incorporated herein in its entirety by reference.

INDUSTRIAL APPLICABILITY

The present invention can be applied to, for example, various systems that support task allocation in a multi-processor system. The system can be incorporated, for example, into an ordinary computer.

REFERENCE SIGNS LIST

1 TASK ALLOCATION OPTIMIZATION SYSTEM
11 TASK SET PARAMETER HOLD UNIT
12 STATE/TASK-SET CORRESPONDENCE TABLE HOLD UNIT
13 OPTIMIZATION UNIT
131 STATE EVALUATION FUNCTION VALUE GENERATION UNIT
132 INTEGRATED EVALUATION FUNCTION VALUE GENERATION UNIT
133 OPTIMAL ALLOCATION SEARCH UNIT
5 COMPUTER
51 PROCESSOR
52 STORAGE DEVICE
61 TASK ALLOCATION OPTIMIZATION PROGRAM
62 TASK SET DEFINITION FILE
63 STATE/TASK-SET CORRESPONDENCE TABLE DEFINITION FILE
64 TASK OPTIMAL ALLOCATION DEFINITION FILE
201 GRANULARITY INFORMATION ACQUISITION UNIT
202 GRANULARITY INFORMATION REGISTRATION UNIT

203 OUTPUT UNIT
204 CONFIGURATION INFORMATION GENERATION UNIT
205 CONFIGURATION INFORMATION REGISTRATION UNIT
206 DEPENDENCE INFORMATION GENERATION UNIT
207 DEPENDENCE INFORMATION REGISTRATION UNIT
208 PERFORMANCE INFORMATION REGISTRATION UNIT

The invention claimed is:

1. A task allocation optimization system, comprising:
a state evaluation function value generation unit configured to generate a state evaluation function value, for each operating state, based on a state/task-set correspondence table and a task set parameter,
the state/task-set correspondence table, indicating correspondence of a list of operating states that change according to a state of a system and a task set that is a set of a plurality of tasks being operated in each of the operating states,
where the system is comprised of a plurality of processor-cores, the task set parameter that indicates a characteristic of each task constituting the task set, and the state evaluation function value that is an evaluation value indicating a degree of quality of task allocation for a plurality of task allocation candidates respectively when each task of the operating states is allocated to the plurality of processor-cores;
an integrated evaluation function value generation unit configured to generate an integrated evaluation function value, for each task allocation candidate, in which the state evaluation function value of each operating state is integrated, the integrated evaluation function value being an evaluation value indicating a degree of quality for a whole of the system; and
an optimal allocation search unit configured to optimize allocation of a task to be allocated to each of the plurality of processor-cores by searching for an allocation candidate with the highest degree of quality of the integrated evaluation function value from the plurality of task allocation candidates, wherein,
the task set parameter includes an execution time in each task,
the state evaluation function value generation unit calculates a total value by summing up the execution time for each of the plurality of processor-cores which each task is allocated as the allocation candidate, and uses one of the group consisting of i) an absolute value of a difference between the total values of the processor-cores as the state evaluation function value, and ii) a square of a difference between the total values of the processor-cores as the state evaluation function value,
when the state evaluation function value is smaller, the degree of quality is higher, and
the optimal allocation search unit selects the allocation candidate having a small integrated evaluation function value preferentially as optimal allocation.

2. The task allocation optimization system according to claim 1, wherein
the task set parameter includes dependence relations between tasks, and
the state evaluation function value generation unit uses a number of the dependence relations between tasks as the state evaluation function value, the dependence relations between tasks which are allocated to different processor-cores for each operating state as the allocation candidate.

3. The task allocation optimization system according to claim 2, wherein the integrated evaluation function value generation unit uses a sum total of the state evaluation function value in each operating state as the integrated evaluation function value.

4. The task allocation optimization system according to claim 2, wherein the integrated evaluation function value generation unit uses a product of all state evaluation function value in each operating state as the integrated evaluation function value.

5. The task allocation optimization system according to claim 2, further comprising:
a state/task-set correspondence table hold unit configured to hold an externally-input state/task-set correspondence table; and
a task set parameter hold unit configured to hold an externally-input task set parameter.

6. The task allocation optimization system according to claim 1, wherein the integrated evaluation function value generation unit uses a sum total of the state evaluation function value in each operating state as the integrated evaluation function value.

7. The task allocation optimization system according to claim 6, further comprising:
a state/task-set correspondence table hold unit configured to hold an externally-input state/task-set correspondence table; and
a task set parameter hold unit configured to hold an externally-input task set parameter.

8. The task allocation optimization system according to claim 1, wherein the integrated evaluation function value generation unit uses a product of all state evaluation function value in each operating state as the integrated evaluation function value.

9. The task allocation optimization system according to claim 1, further comprising:
a state/task-set correspondence table hold unit configured to hold an externally-input state/task-set correspondence table; and
a task set parameter hold unit configured to hold an externally-input task set parameter.

10. A task allocation optimization method, comprising:
generating a state evaluation function value, for each operating state, based on a state/task-set correspondence table and a task set parameter, the state/task-set correspondence table indicating correspondence of a list of operating states that change according to an operating state of a system and a task set that is a set of a plurality of tasks being operated in each of the operating states,
the system comprising a plurality of processor-cores, the task set parameter that indicates a characteristic of each task constituting the task set, the state evaluation function value that is an evaluation value indicating a degree of quality of task allocation for a plurality of task allocation candidates respectively when each task of the operating states is allocated to the plurality of processor-cores;
generating an integrated evaluation function value, for each task allocation candidate, in which the state evaluation function value of each operating state is integrated, the integrated evaluation function value being an evaluation value indicating a degree of quality for a whole of the system; and
optimizing allocation of a task to be allocated to each of the plurality of processor-cores by searching for an allocation candidate with the highest degree of quality of the integrated evaluation function value from the plurality of task allocation candidates, wherein, the task set parameter includes an execution time in each task, the state evaluation function value generation unit calculates a total value by summing up the execution time for each of the plurality of processor-cores which each task is allocated as the allocation candidate, and uses one of the group consisting of i) an absolute value of a difference between the total values of the processor-cores as the state evaluation function value, and ii) a square of a difference between the total values of the processor-cores as the state evaluation function value, when the state evaluation function value is smaller, the degree of quality is higher, and the optimal allocation search unit selects the allocation candidate having a small integrated evaluation function value preferentially as optimal allocation.

11. A non-transitory computer readable medium storing a task allocation optimization program that causes a computer to execute a task allocation optimization process in a system comprising a plurality of processor-cores, wherein the optimization process includes:

generating a state evaluation function value, for each operating state, based on a state/task-set correspondence table and a task set parameter, the state/task-set correspondence table indicating correspondence of a list of operating states that change according to a state of a system with a task set that is a set of a plurality of tasks being operated in each of the operating states, the system comprising a plurality of processor-cores, the task set parameter that indicates a characteristic of each task constituting the task set, the state evaluation function value that is an evaluation value indicating a degree of quality of task allocation for a plurality of task allocation candidates respectively when each task of the operating states is allocated to the plurality of processor-cores;

generating an integrated evaluation function value, for each task allocation candidate, in which the state evaluation function value of each operating state is integrated, the integrated evaluation function value being an evaluation value indicating a degree of quality for a whole of the system; and optimizing allocation of a task to be allocated to each of the plurality of processor-cores by searching for an allocation candidate with the highest degree of quality of the integrated evaluation function value from the plurality of task allocation candidates, wherein, the task set parameter includes an execution time in each task, the state evaluation function value generation unit calculates a total value by summing up the execution time for each of the plurality of processor-cores which each task is allocated as the allocation candidate, and uses one of the group consisting of i) an absolute value of a difference between the total values of the processor-cores as the state evaluation function value, and ii) a square of a difference between the total values of the processor-cores as the state evaluation function value, when the state evaluation function value is smaller, the degree of quality is higher, and the optimal allocation search unit selects the allocation candidate having a small integrated evaluation function value preferentially as optimal allocation.

* * * * *